July 14, 1936.   F. D. SNYDER   2,047,599
APPARATUS FOR THE MANUFACTURE OF PREPARED FEEDS
Filed Sept. 18, 1933   2 Sheets-Sheet 1
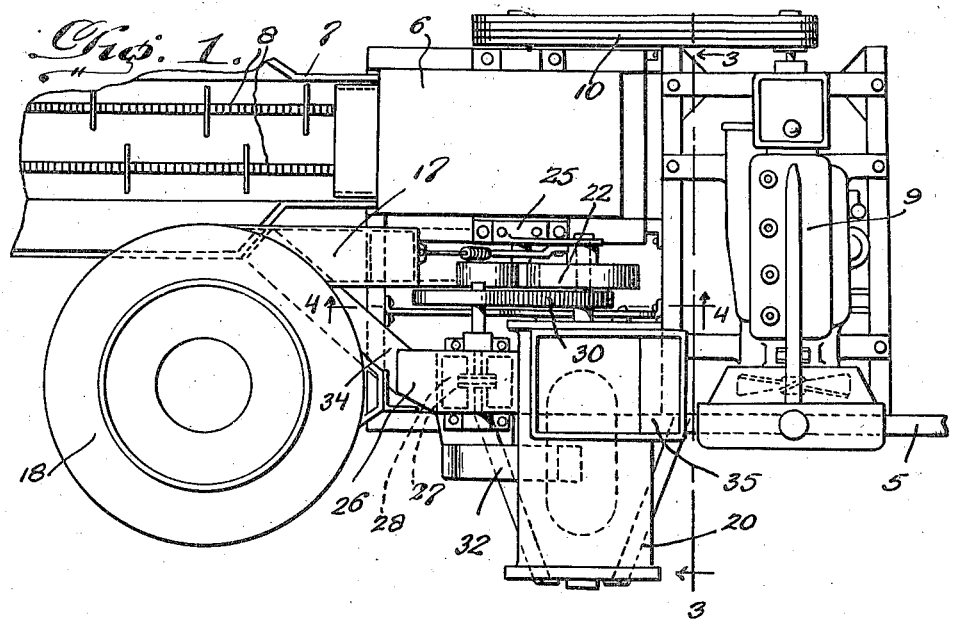
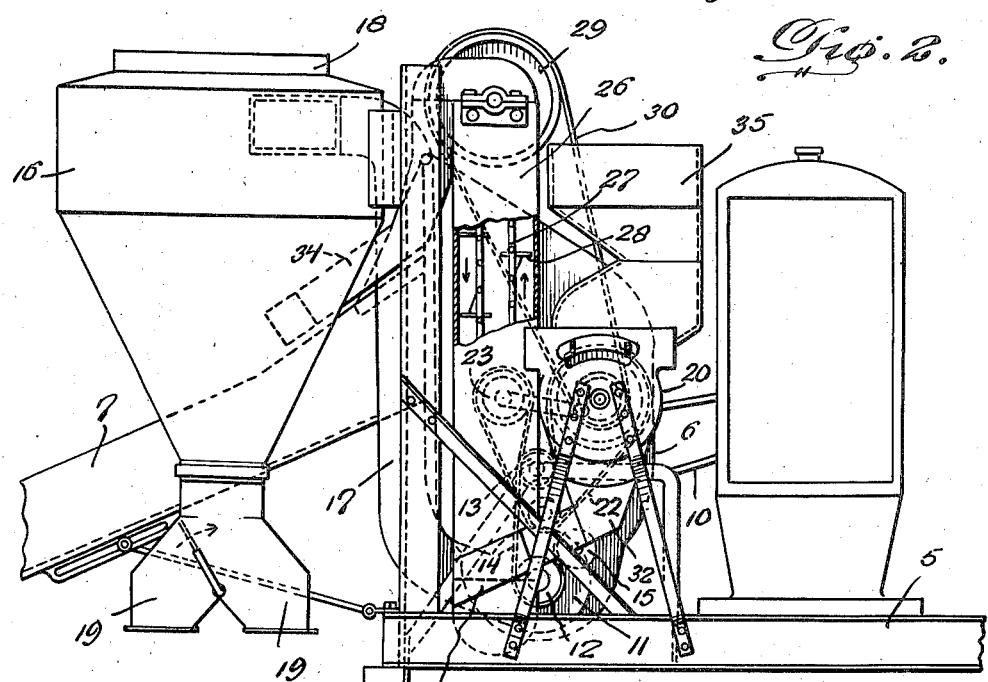
Frank D. Snyder, INVENTOR.
BY J. Stanley Burch
ATTORNEY.

Frank D. Snyder,
INVENTOR.

BY J. Stanley Burch
ATTORNEY.

Patented July 14, 1936

2,047,599

UNITED STATES PATENT OFFICE 2,047,599

APPARATUS FOR THE MANUFACTURE OF PREPARED FEEDS

Frank D. Snyder, Cardington, Ohio

Application September 18, 1933, Serial No. 689,987

1 Claim. (Cl. 83—11)

This invention relates to apparatus for manufacturing prepared feeds, and has more particular reference to an apparatus of this kind for shelling corn and grinding and mixing such shelled corn with another ingredient or other ingredients to produce a prepared feed.

More specifically, the invention contemplates an apparatus of the above kind including a corn sheller, a hammer mill or grinder, and means for feeding the shelled corn from the corn sheller, along with another ingredient or other ingredients, such as oats, wheat, and/or roughage, to the mill or grinder and in proper proportions for being ground and mixed by said mill or grinder to produce a prepared feed.

Still more specifically, the invention contemplates an apparatus of the above kind which is as nearly continuous and automatic in action as possible, whereby the prepared feed may be quickly and economically produced with the expenditure of a minimum amount of manual labor and by an organized mechanism whose successful operation requires little attention or special skill.

Still another object of the present invention is to provide an apparatus of the above kind involving a comparatively simple and efficient modification of a conventional portable feed grinding apparatus, whereby the single source of power utilized to operate the mill or grinder and other mechanism of such conventional apparatus is also utilized to operate the corn sheller and means for conveying the shelled corn from such corn sheller to the mill or grinder or its feeder.

With the above general objects in view, and others that will become apparent as the nature of the invention is better understood, the invention consists in the novel form, combination and arrangement of parts hereinafter more fully described, shown in the accompanying drawings, and claimed.

In the drawings, wherein like reference characters indicate similar parts throughout the several views:

Figure 1 is a fragmentary top plan view of an apparatus embodying the present invention.

Figure 2 is a side elevational view thereof.

Figure 3:
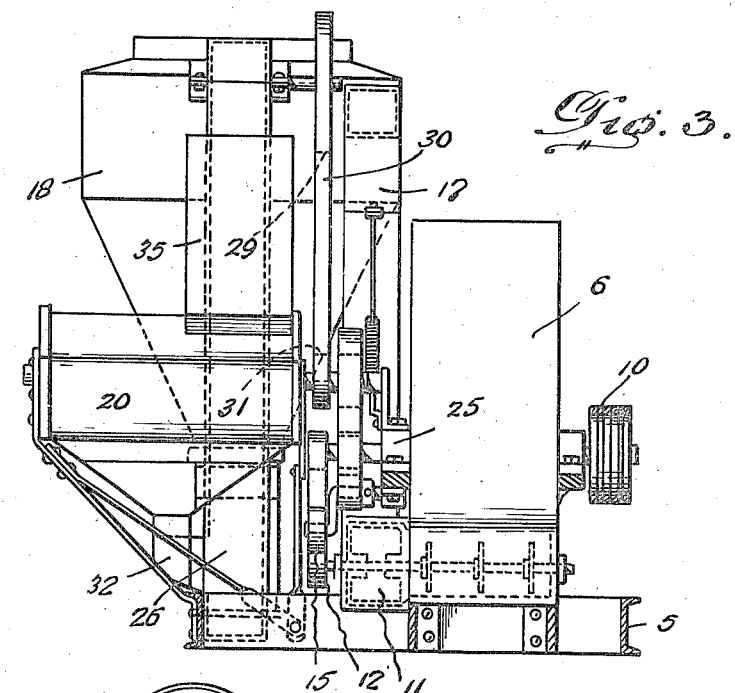
Figure 3 is a transverse vertical section on line 3—3 of Figure 1.
Figure 4:
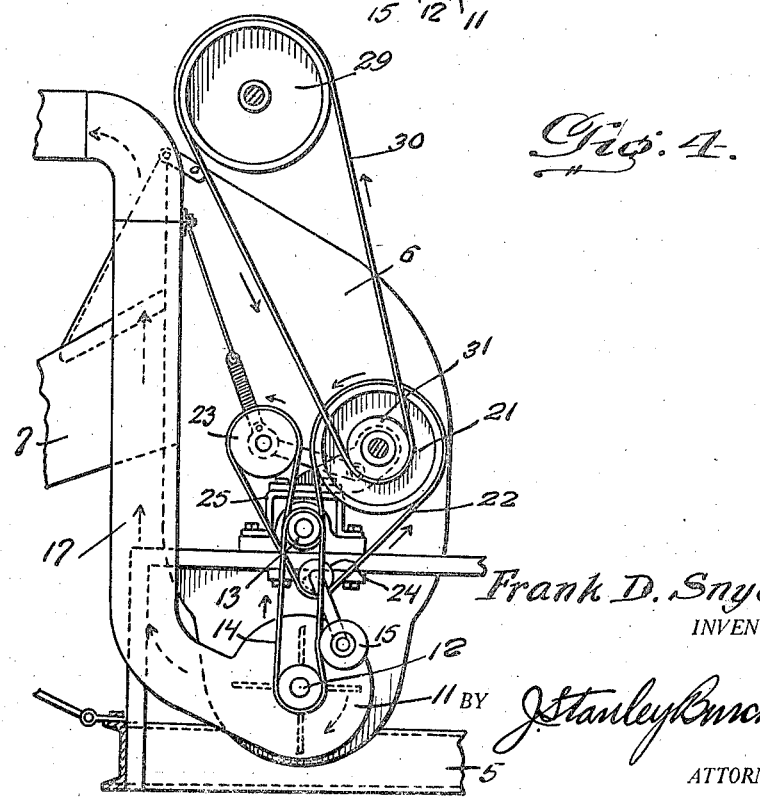
Figure 4 is a fragmentary vertical longitudinal section on line 4—4 of Figure 1.

Referring more in detail to the drawings, 5 indicates the supporting frame of the apparatus, which may consist of the rear portion of the chassis frame of a motor truck. Mounted at the rear of the frame 5 near one side is the usual conventional hammer mill or grinder 6 of the type illustrated in the U. S. Patent to T. C. Alfred No. 1,829,325, dated October 27, 1931, said mill or grinder having a suitable rearwardly extending feeder 7 which may be of any well known or preferred construction, but which is shown as embodying a pair of endless carriers 8 for conveying the oats, roughage or the like into the top of the grinder or mill 6. As is also usual in portable apparatus of this kind, an internal combustion engine 9 is mounted on the frame 5 transversely of the latter and in front of the grinder 6 and operatively connected by a belt gearing 10 with the mill or grinder 6 at the outer side of the latter for driving the same. This type of mill or grinder 6 has a bottom outlet chamber open at the inner side and directly communicating with the casing of a blower 11 bolted against the inner side of the mill or grinder casing. The fan of blower 11 is carried by a shaft 12 that extends into the outlet chamber of the grinder 6 where it is equipped with an agitator, as and for the purpose clearly set forth in the Alfred patent mentioned above. The rotor drive shaft of the grinder projects at the inner side of the casing of the latter where it is provided with a pulley 13 operatively connected with the blower shaft 12 by a belt gearing 14 including a belt tightener 15. Mounted on the rear of the frame 5 at the inner side of feeder 7 is a centrifugal separator 16 into which the outlet duct or conduit 17 of blower 11 opens tangentially in the usual manner. It will be understood that the blower conveys the ground and mixed material to the separator 16, the air and lighter foreign material being discharged through the top outlet 18 of the separator 16, and the heavier valuable material settling to the bottom of the separator, from whence it may be selectively discharged through either of the two outlet spouts 19 into suitable receptacles for storage or transportation. The construction as thus far described is more or less conventional and well known in the art.

In accordance with the present invention, I mount a corn sheller 20 of any well known or preferred construction upon the frame 5 at the inner side of the grinder 6 and at a suitable elevation above the supporting frame 5 so that the discharge end of the sheller for the corn cobs is located outwardly beyond the adjacent side of the frame 5 to permit convenient disposal of the corn cobs as they are discharged from the corn sheller. This corn sheller is preferably of the general type illustrated in the U. S. Patent to Williamson et al., No. 32,909, dated July 23, 1861, although other types and constructions of corn shellers might be successfully employed. The drive shaft of the corn sheller projects at the inner end of the latter where it is equipped with a relatively large pulley 21 driven from the pulley 13 on the rotor shaft of grinder 6 by means of a belt gearing 22 including a belt tightener 23 and an idler pulley 24 mounted on the supporting arm of the belt tightener 15. A suitable bracket 25 is mounted upon the inner bearing for the rotor shaft of grinder 6 to form a mounting for pulley 21 and for the arm of belt tightener 23.

I further mount upon the frame 5 a vertical elevator 26 which is arranged directly at the rear side of corn sheller 20, and which preferably includes a casing in which is arranged to travel an endless carrier 27 provided with flights or paddles 28. The endless carrier 27 extends about sprocket wheels on head and foot shafts respectively journaled at the top and bottom of the elevator casing, the head shaft projecting at the inner side of the elevator casing and equipped with a large pulley 29 operatively connected by a driving belt 30 with a further small pulley 31 fixed on the shaft of pulley 21. It will thus be seen that in this way the endless carrier of the elevator is driven by a chain of belt gearing from the rotor shaft of mill or grinder 6.

The corn sheller 20 is provided with a bottom inclined discharge spout 32 for the shelled corn whose lower end communicates with the bottom of the casing of elevator 26 through the outer side of the latter, the spout 32 having a removable section 33 at the side inlet opening of the casing of elevator 26, so as to facilitate access to the internal bearings for the foot shaft of elevator 26, for lubrication or other purposes. It will thus be seen that the shelled corn from the sheller 20 is delivered by gravity through the spout 32 into the lower end of the elevator 26 from whence it is elevated by the carrier 27 to the top of said elevator where the latter is provided with an inclined discharge spout 34 that extends inwardly and rearwardly to a point adjacent the inner side of feeder 7 so as to discharge the shelled corn into said feeder for being delivered along with the other ingredient or ingredients to the mill or grinder 6 for being mixed and ground to produce the prepared feed. It will be noted that the construction is comparatively compact and simple and provides an arrangement whereby the several operations may be efficiently carried out in a continuous and substantially automatic manner, the apparatus requiring comparatively little attention or skill for its successful use. The corn sheller 20 is provided with the usual feed hopper 35 to receive the ears of corn to be shelled, and the other ingredients are suitably discharged into the feeder 7. From the foregoing description, it will be seen that the corn will be automatically shelled and the shelled corn will be automatically delivered along with the other ingredients to the mill or grinder 6 for being effectively mixed and ground to produce a prepared feed mixture which is subsequently cleaned of foreign matter in the separator 16 in producing the final product or prepared feed which is discharged into suitable containers through the spouts 19. It will be particularly noted that my invention provides a highly efficient apparatus for achieving the stated objects of such invention. Minor changes in the specific construction illustrated and described are contemplated within the spirit and scope of the invention as claimed.

What I claim as new is:

An apparatus for the manufacture of prepared feeds, comprising an elevated supporting frame, a grinding mill mounted on said frame at the rear and adjacent one side of the latter, an inclined feeder extending rearwardly of said frame and arranged to feed certain feed material forwardly and upwardly from a point adjacent the ground into the top of said grinding mill, a motor mounted transversely of and on the frame forwardly of the grinder and operatively connected to the latter for driving the same, a corn sheller mounted upon the frame beside the grinder and rearwardly of the motor, an elevator mounted upon the frame rearwardly of the corn sheller, driving connections between said grinder and the head shaft of said elevator, further driving connections between said grinder and said corn sheller, means to convey the shelled corn from the corn sheller to the bottom of the elevator, a rearwardly inclined and inwardly extending discharge spout for directing the shelled corn from the top of the elevator onto said feeder to be supplied with said certain feed material to said grinder, a centrifugal separator mounted in an elevated position on and arranged rearwardly of the frame beside said feeder for discharging the prepared feed into suitable containers positioned beneath said separator, a blower mounted on the inner side of the grinder and forming part of means for conveying the ground and mixed ingredients from the grinder to the separator, and a driving connection between the grinder and said blower.

FRANK D. SNYDER.